(12) United States Patent
Scalici

(10) Patent No.: US 10,598,280 B2
(45) Date of Patent: Mar. 24, 2020

(54) ACTUATION UNIT FOR CONTROLLING THE ANGULAR POSITION OF A CONTROL MEMBER, PARTICULARLY FOR A VEHICLE TRANSMISSION

(71) Applicant: Dana Graziano S.r.L., Rivoli (Turin) (IT)

(72) Inventor: Giorgio Scalici, Alessandria (IT)

(73) Assignee: Dana Graziano S.r.l., Frazione Cascine Vica (IT)

(*) Notice: Subject to any disclaimer, the term of this patent is extended or adjusted under 35 U.S.C. 154(b) by 314 days.

(21) Appl. No.: 15/666,727

(22) Filed: Aug. 2, 2017

(65) Prior Publication Data

US 2018/0038480 A1 Feb. 8, 2018

(30) Foreign Application Priority Data

Aug. 4, 2016 (IT) .................. 102016000082166

(51) Int. Cl.
*F16H 63/34* (2006.01)
*F16H 61/12* (2010.01)

(52) U.S. Cl.
CPC ..... *F16H 63/3466* (2013.01); *F16H 63/3458* (2013.01); *F16H 63/3491* (2013.01); *F16H 2061/1288* (2013.01); *F16H 2061/1292* (2013.01)

(58) Field of Classification Search
CPC ............ F16H 63/3466; F16H 63/3458; F16H 63/3491; F16H 2061/1288; F16H 2061/1292; F16H 63/34
See application file for complete search history.

(56) References Cited

U.S. PATENT DOCUMENTS 5,620,077 A 4/1997 Richard

FOREIGN PATENT DOCUMENTS

| DE | 10105637 | 8/2002 |
| DE | 10157460 | 6/2003 |
| WO | 02/21022 | 3/2002 |

OTHER PUBLICATIONS

Italian Search Report, dated Jun. 7, 2017.
European Search Report, European Patent Application No. 17184475. 6, European Patent Office, dated Nov. 28, 2017.

*Primary Examiner* — Huan Le
(74) *Attorney, Agent, or Firm* — Marshall & Melhorn, LLC

(57) ABSTRACT

An actuation unit has a primary motor and a transmission mechanism for transmitting motion generated by the primary motor to a control member. The transmission mechanism includes a first transmission member connected to a drive shaft of the primary motor, a second transmission member drivingly connected to the control member, and a coupling member shiftable between an engagement position and a disengagement position. The transmission mechanism further includes a first elastic member interposed between the first transmission member and the second transmission member to cause rotation of the second transmission member relative to the first transmission member when the coupling member is in the disengagement position, a second elastic member for elastically urging the coupling member towards the engagement position, and an auxiliary actuation device for shifting the coupling member from the engagement position to the disengagement position.

8 Claims, 4 Drawing Sheets

ACTUATION UNIT FOR CONTROLLING THE ANGULAR POSITION OF A CONTROL MEMBER, PARTICULARLY FOR A VEHICLE TRANSMISSION

CROSS-REFERENCE TO RELATED APPLICATIONS

The present invention claims priority to Italian Patent Application No. 102016000082166 filed on Aug. 4, 2016.

BACKGROUND OF THE INVENTION

The present invention relates in general to an actuation unit for controlling the angular position of a control member, in particular a control member used in a vehicle transmission, for example for controlling a locking device for locking the vehicle transmission when the vehicle is parked (the so called park-lock device).

Document WO 02/21022 A1 discloses an actuation unit for a vehicle transmission comprising a control member, in particular a driving shaft, a primary motor, in particular an electric motor, a transmission mechanism which is interposed between the primary motor and the control member to transmit to the control member the motion generated by the primary motor and comprises two transmission members arranged to engage with each other, a spring for normally keeping the two transmission members disengaged from each other, and an electromagnet for moving one of the transmission members towards the other one to engage it. Such a known solution is affected by the problem that in case of interruption in the electric power supply the two transmission members are automatically disengaged from each other by virtue of the elastic force generated by the spring. In case of application of the actuation unit for controlling the park lock device of a vehicle, this means that in case of interruption in the electric power supply the vehicle is automatically locked in the parked condition, even though this is unnecessary and/or undesired.

SUMMARY OF THE INVENTION

It is an object of the present invention to provide an actuation unit of the above-identified type which is provided with a safety function such that in case of emergency, for example in case of failure or non-operation of the primary motor, the control member is moved to a predefined angular position, and which is not affected by the shortcoming of the prior art discussed above.

This and other objects are fully achieved according to the present invention by virtue of an actuation unit comprising a primary motor and a transmission mechanism for transmitting to the control member the motion generated by the primary motor, wherein the transmission mechanism comprises:

a first rotary transmission member arranged to be driven into rotation by the primary motor,
a second rotary transmission member drivingly connected for rotation with the control member,
a coupling member selectively shiftable between an engagement position, in which it connects the first and second transmission members for rotation with each other, and a disengagement position, in which it disconnects the first and second transmission members from each other,
at least one first elastic member interposed between the first and the second transmission members to cause relative rotation of the second transmission member with respect to the first transmission member when the coupling member is in the disengagement position,
at least one second elastic member tending to elastically urge the coupling member towards the engagement position, so that the coupling member is normally kept in the engagement position, and
an auxiliary actuation device arranged to control shifting of the coupling member from the engagement position, in which it is normally kept by the at least one second elastic member, to the disengagement position.

In case of emergency, for example in case of failure or non-operation of the primary motor, the auxiliary actuation device is controlled to shift the coupling member into the disengagement position to disengage the first and the second transmission members from each other. With the coupling member in the disengagement position, the second transmission member, which is drivingly connected for rotation with the control member, rotates with respect to the first transmission member as a result of the elastic action of the at least one first elastic member until it reaches a predefined angular position. In case the actuation unit is used in a vehicle transmission, said predefined angular position of the control member may correspond to a certain mode of operation of the transmission, for example the neutral mode or the parking mode. In this respect, the actuation unit may advantageously be associated to a locking device for locking the transmission when the vehicle is parked (hereinafter simply referred to as "park-lock device") in order to automatically activate the park-lock device in case of emergency, for example in case of failure or non-operation (due for example to a too low battery charge level or to a failure of the electrical system of the vehicle) of the primary motor.

Since the coupling member is normally kept by the at least one second elastic member in the engagement position (so that the first and second transmission members are normally connected for rotation with each other) and shifting of the coupling member from the engagement position to the disengagement position must be controlled by the auxiliary actuation device, movement of the control member into the predefined angular position does not occur automatically in case of emergency, but is to be authorized by an electronic control unit managing the operation of the actuation unit, in case the auxiliary actuation device is a motor, for example an electric motor, or by the user, in case the auxiliary actuation device is a manual device. It is thus possible to avoid that an event that is not to be regarded as an "emergency" (for example a very short interruption in the electric power supply) might lead to the activation of the safe mode of the actuation unit, that is to the movement of the control member into the predefined angular position, contrary to the prior art. In case, for example, the actuation unit is intended to control a park-lock device of the vehicle, the activation of the safe mode of the actuation unit can thus be subject to a series of preliminary checks (including, for example, checking the driving speed of the vehicle), so that movement of the control member into the predefined angular position (in this case, the angular position corresponding to the parking mode) occurs if and only if all the preliminary checks have been successfully completed.

BRIEF DESCRIPTION OF THE DRAWINGS

Further features and advantages of the present invention will become apparent from the following detailed description, given purely by way of non-limiting example with reference to the appended drawings, where.

DETAILED DESCRIPTION OF PREFERRED EMBODIMENTS

Figure 1:
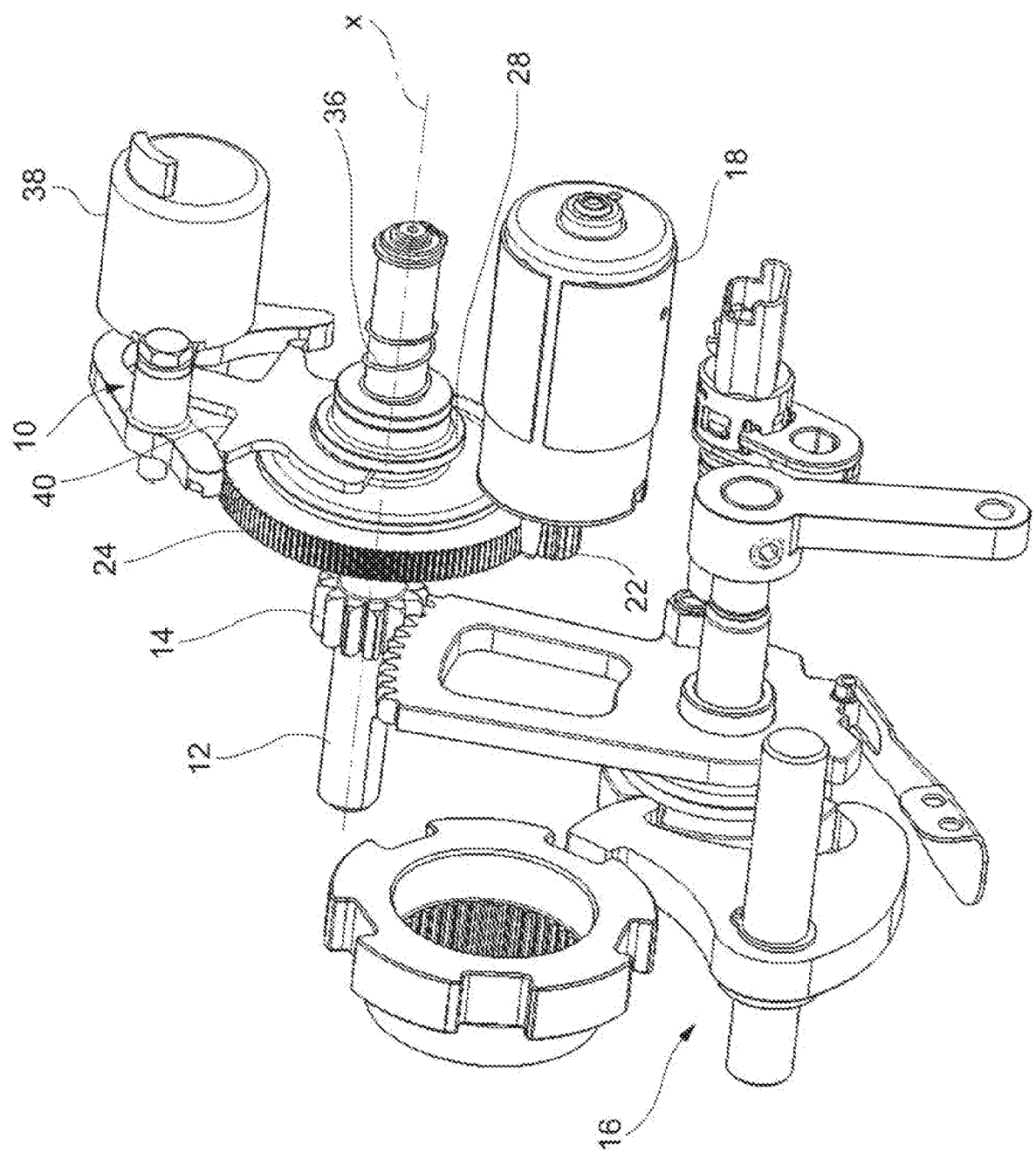
FIG. 1 is a perspective view of an actuation unit according to an embodiment of the present invention, associated to a park-lock device of a motor vehicle.
Figure 2:
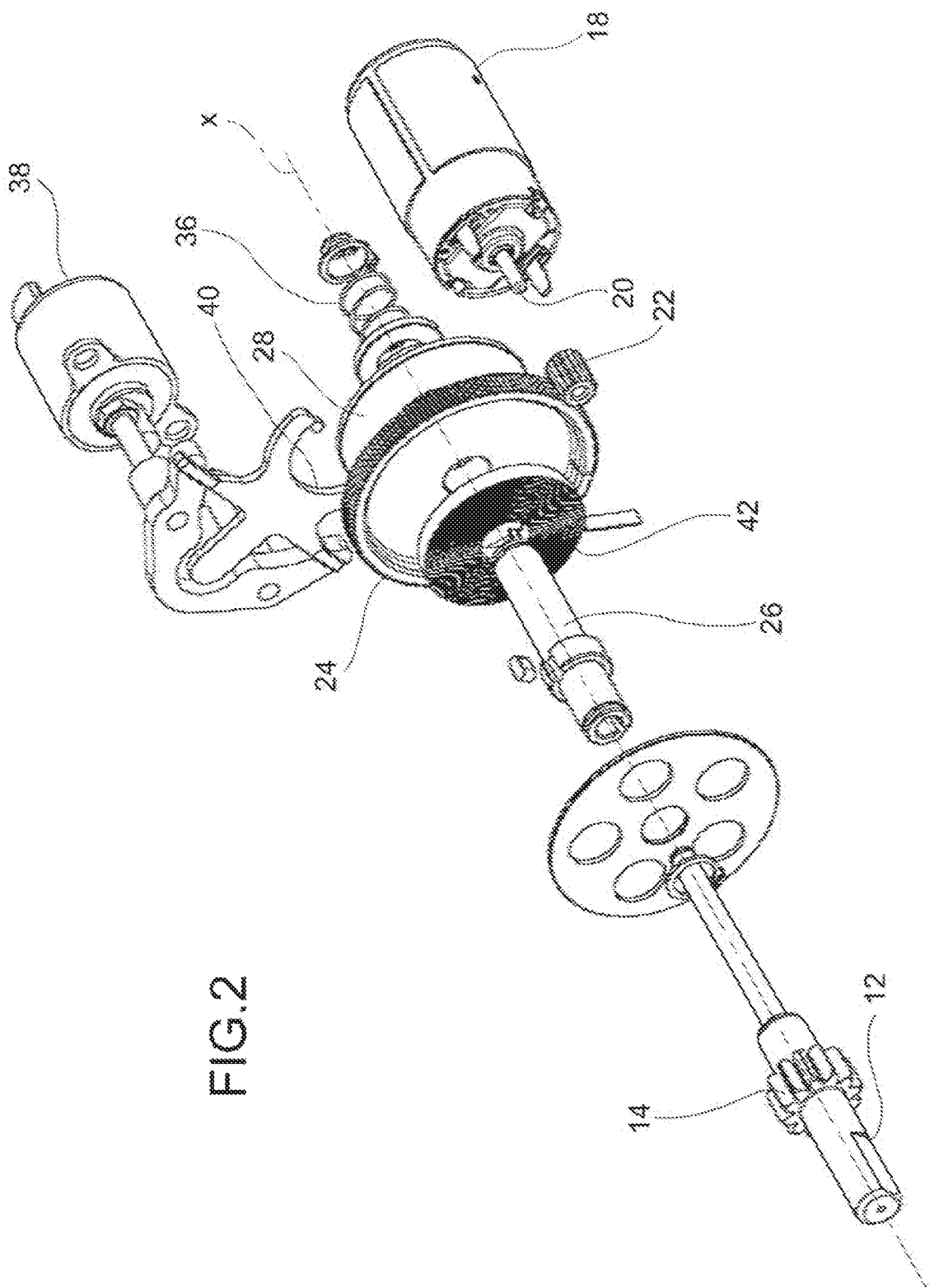
FIGS. 2 and 3 are exploded views, from different point of views, of the actuation unit of FIG. 1.
Figure 3:
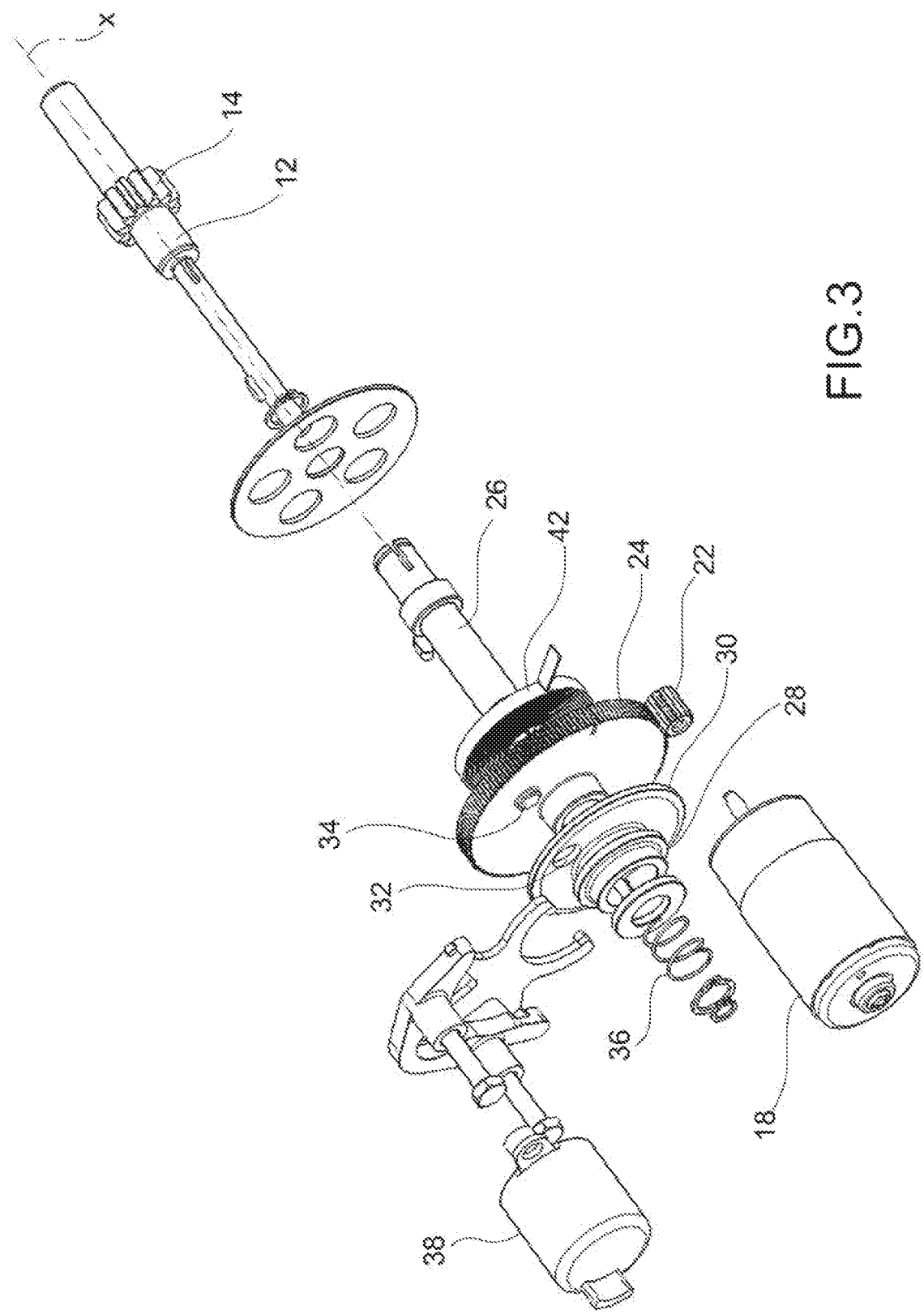

With reference to the drawings, an actuation unit according to an embodiment of the present invention is generally indicated 10.

The actuation unit 10 is arranged to control the angular position of a control member 12 (in particular, but not necessarily, a control member of a vehicle transmission) about an axis of rotation x. In the exemplary embodiment shown in the drawings, the control member 12 is a shaft which is rotatable about the axis of rotation x and carries a gearwheel 14. The invention is not however limited to the case of a control member made as a shaft, but the control member may be any other type of rotating member. Furthermore, in the proposed exemplary embodiment the control member 12 is intended to control a park-lock device, generally indicated 16, but of course it could be used to control any other device, not necessarily a device mounted on a vehicle transmission. The device 16 will not be described in detail here, both because it is of a per-se-known type and because it does not form part of the present invention.

The actuator unit 10 comprises first of all a primary motor 18, preferably made as an electric motor, having a drive shaft 20 on which a pinion 22 is mounted. The actuator unit 10 further comprises a transmission mechanism interposed between the primary motor 18 and the control member 12 to transmit the rotary motion generated by the primary motor 18 to the control member 12.

The transmission mechanism comprises a first rotary transmission member 24 arranged to be driven into rotation by the drive shaft 20 of the primary motor 18 and a second rotary transmission member 26 drivingly connected for rotation with the control member 12.

Preferably, the first rotary transmission member 24 is permanently connected for rotation with the drive shaft 20 of the primary motor 18. According to the embodiment shown in the drawings, the first transmission member 24 is a gearwheel (and for this reason the first transmission member 24 will be hereinafter referred to as gearwheel 24) meshing with the pinion 22. The gearwheel 24 may directly mesh with the pinion 22, as in the proposed embodiment, or, alternatively, there may be provided one or more intermediate gearwheels between the pinion 22 and the gearwheel 24, which are suitably sized depending on the desired transmission ratio between the pinion 22 and the gearwheel 24.

According to the embodiment shown in the drawings, the second transmission member 26 is a shaft (and for this reason the second transmission member 26 will be hereinafter referred to as shaft 26), preferably arranged coaxially with the control member 12. The gearwheel 24 is idly mounted on the shaft 26.

The actuation unit 10 further comprises an engagement sleeve 28 that is mounted on the shaft 26 so as to be drivingly connected for rotation with said shaft, but axially slidable relative to said shaft. The engagement sleeve 28 comprises a flange 30 having a hole 32 arranged to be engaged by a pin 34 axially protruding from the face of the gearwheel 24 facing towards the engagement sleeve 28. The engagement sleeve 28 is elastically urged by a spring 36 towards the gearwheel 24, so that the hole 32 of the engagement sleeve 28 is normally engaged by the pin 34 of the gearwheel 24 and thus the engagement sleeve 28 is coupled for rotation with the gearwheel 24. As the engagement sleeve 28 is drivingly connected for rotation with the shaft 26, as explained above, in this condition the gearwheel 24 and the shaft 26 are drivingly connected for rotation with each other through the engagement sleeve 28.

The actuation unit 10 further comprises an auxiliary actuation device 38 arranged to control the axial displacement of the engagement sleeve 28 from the engagement position to the disengagement position, in which disengagement position the pin 34 of the gearwheel 24 is disengaged from the hole 32 of the engagement sleeve 28, and thus the gearwheel 24 and the shaft 26 are free to rotate with respect to each other.

Figure 4:
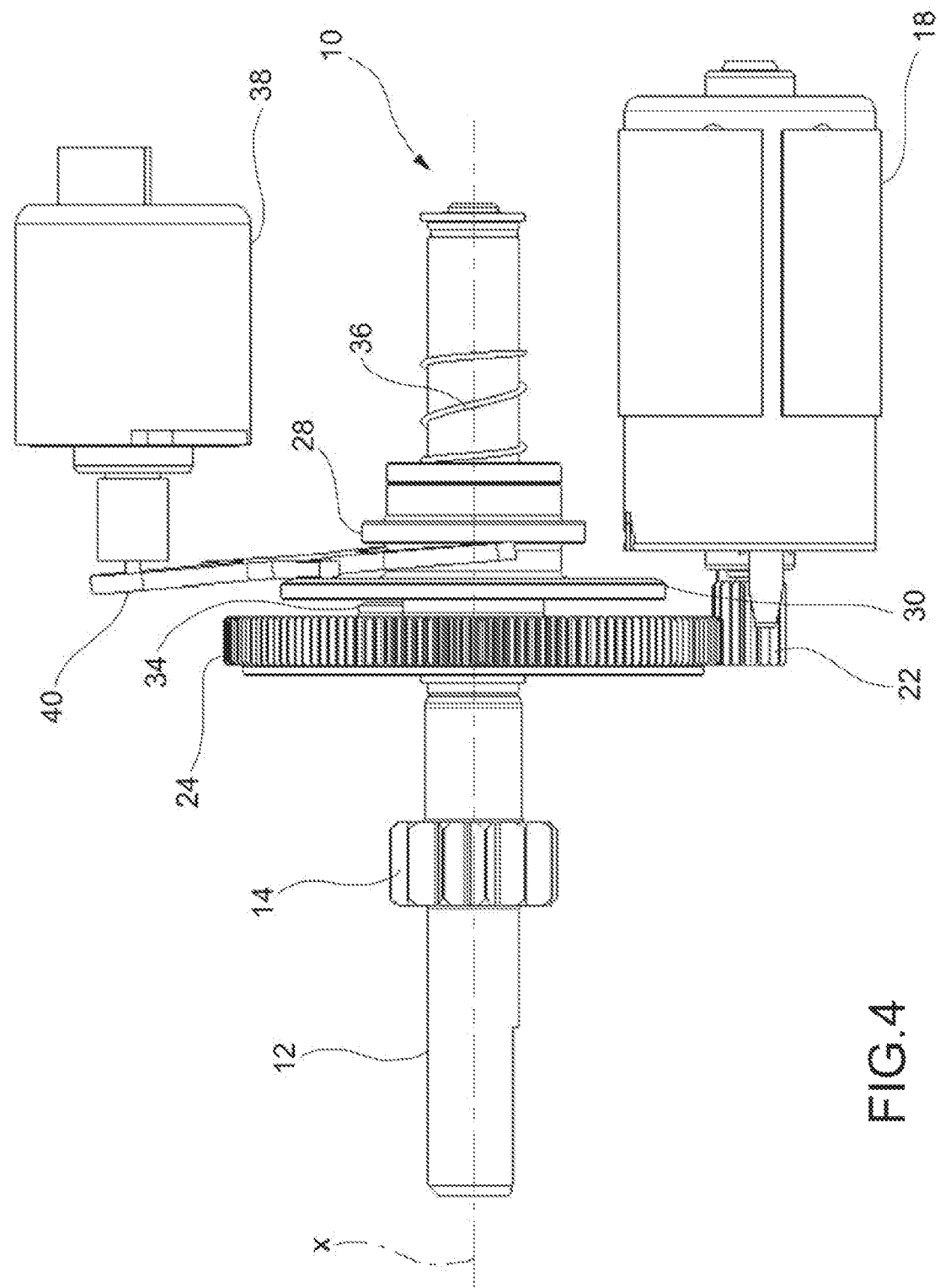
FIG. 4 is a side elevation view of the actuation unit of FIG. 1.

The auxiliary actuation device 38 may be a motor (for example an electric motor) or a manual actuation device to be controlled directly or indirectly by the user (for example, through a cable). The auxiliary actuation device 38 acts on the engagement sleeve 28 through, for example, a fork 40, as shown in particular in FIG. 4.

In case the auxiliary actuation device 38 is made as a motor, it may indifferently be a linear motor, such as for example a linear solenoid (as in the embodiment shown in the drawings), or a rotary motor, preferably an electric motor, and in this second case it may be provided with a motion conversion mechanism (for example a nut-and-screw mechanism) for converting the rotary motion generated by the motor into a translation motion of the fork 40, or of at least a portion of the fork 40. Alternatively, the auxiliary actuation device 38 may also be configured to control the engagement sleeve directly, thus without the need for a fork or any other actuation member interposed between the auxiliary actuation device 38 and the engagement sleeve 28.

In case the auxiliary actuation device 38 is made as a motor, the auxiliary actuation device 38, as well as the primary motor 18, is controlled by an electronic control unit (not shown) that manages oversees the operation of the actuation unit 10.

The actuation unit 10 further comprises at least one further spring, separate from the spring 36, interposed between the gearwheel 24 and the shaft 26 to cause a relative rotation of the shaft 26 with respect to the gearwheel 24 when the engagement sleeve 28 is in the disengagement position. Said at least one further spring is, for example, a preloaded spring 42 having an end connected to the gearwheel 24 and the opposed end connected to the shaft 26. According to the embodiment shown in the drawings, the spring 42 is a flat spiral spring with a rectangular cross-section and is preferably accommodated within the gearwheel 24. The operation of the above-described actuation unit 10 will be now briefly described, with particular reference to the case of an auxiliary actuation device made as a motor.

In normal operating conditions, the engagement sleeve 28 is kept by the spring 36 in the engagement position, in which it is drivingly connected for rotation with the gearwheel 24 thanks to the engagement of the pin 34 of the gearwheel 24 in the hole 32 of the engagement sleeve 28. In such a condition, therefore, the rotary motion in either direction generated by the primary motor is transmitted to the shaft 26, and thus to the control member 12, through the pinion 22, the gearwheel 24 and the engagement sleeve 28. When, in case of emergency, the auxiliary actuation device 38 is activated by the electronic control unit, for example—in case the actuation unit 10 is used on a vehicle transmission—because of a failure in the electrical system or because of a too low battery charge level, the auxiliary actuation device 38 causes the engagement sleeve 28 to shift from the engagement position to the disengagement position. Accordingly, the shaft 26, and thus the control member 12, is free to rotate with respect to the gearwheel 24, as it is no more coupled to said wheel through the engagement sleeve 28. Therefore, as a result of the preload of the spring 42 interposed between the gearwheel 24 and the shaft 26, the gearwheel 24 and the shaft 26 rotate with respect to each other.

Preferably, end stop means are associated with the gearwheel 24 to prevent rotation of the gearwheel 24 beyond a certain limit, so that the elastic energy stored in the spring 42 ensures that the shaft 26, and thus the control member 12, is able to rotate up to a certain end position corresponding with said predefined angular position.

The actuation unit 10 can then easily be brought back to the normal operating position by loading the spring 42 and bringing the engagement sleeve 28 back to the engagement position in which it is coupled with the gearwheel 24 by engagement of the pin 34 in the hole 32. Such an operation may be carried out by properly controlling the primary motor 18.

Naturally, the principle of the invention remaining unchanged, the embodiments and constructional details may vary widely with respect to those described and illustrated here purely by way of a non-limiting example, without thereby departing from the scope of the invention as defined in the accompanying claims.

What is claimed is:

1. An actuation unit for controlling the angular position of a control member, comprising a primary motor and a transmission mechanism for transmitting to the control member the motion generated by the primary motor, wherein the transmission mechanism comprises a first rotary transmission member arranged to be driven into rotation by the primary motor, a second rotary transmission member arranged to be drivingly connected for rotation with the control member, a coupling member selectively shiftable between an engagement position, in which it connects the first and second transmission members for rotation with each other, and a disengagement position, in which it disconnects the first and second transmission members from each other, an auxiliary actuation device arranged to control shifting of the coupling member between the engagement position and the disengagement position, at least one first elastic member interposed between the first and second transmission members to cause rotation of the second transmission member relative to the first transmission member when the coupling member is in the disengagement position, and at least one second elastic member tending to elastically urge the coupling member towards the engagement position, so that the coupling member is normally kept in the engagement position and the auxiliary actuation device, when activated, controls shifting of the coupling member from the engagement position to the disengagement position, acting against said at least one second elastic member, wherein the first transmission member is a gearwheel and the second transmission member is a shaft on which the first transmission member is idly mounted.

2. The actuation unit of claim 1, wherein the coupling member is a sleeve mounted on the second transmission member so as to be drivingly connected for rotation with the second transmission member, but axially slidable relative to the second transmission member between the engagement position and the disengagement position, and wherein the coupling member and the first transmission member are provided with respective engagement elements arranged to engage with each other when the coupling member is in the engagement position.

3. The actuation unit of claim 2, wherein said at least one second elastic member comprises a spring tending to urge the coupling member towards the first transmission member to couple the coupling member for rotation with the first transmission member.

4. The actuation unit of claim 1, wherein the first transmission member is permanently connected to a drive shaft of the primary motor.

5. The actuation unit of claim 1, wherein said at least one first elastic member comprises a preloaded spring, which is connected at a first end thereof to the first transmission member and at the other end thereof to the second transmission member.

6. The actuation unit of claim 1, wherein the auxiliary actuation device is an electric motor.

7. An actuation unit for controlling the angular position of a control member, comprising a primary motor and a transmission mechanism for transmitting to the control member the motion generated by the primary motor, wherein the transmission mechanism comprises a first rotary transmission member arranged to be driven into rotation by the primary motor, a second rotary transmission member arranged to be drivingly connected for rotation with the control member, a coupling member selectively shiftable between an engagement position, in which it connects the first and second transmission members for rotation with each other, and a disengagement position, in which it disconnects the first and second transmission members from each other, an auxiliary actuation device arranged to control shifting of the coupling member between the engagement position and the disengagement position, at least one first elastic member interposed between the first and second transmission members to cause rotation of the second transmission member relative to the first transmission member when the coupling member is in the disengagement position, and at least one second elastic member tending to elastically urge the coupling member towards the engagement position, so that the coupling member is normally kept in the engagement position and the auxiliary actuation device, when activated, controls shifting of the coupling member from the engagement position to the disengagement position, acting against said at least one second elastic member, wherein said at least one first elastic member comprises a preloaded spring, which is connected at a first end thereof to the first transmission member and at the other end thereof to the second transmission member.

8. A vehicle transmission comprising a parking pawl for locking the transmission when the vehicle is parked, a rotary control member for controlling the parking pawl and an actuation unit according to any one of the preceding claims, wherein said actuation unit is arranged to control the angular position of said control member.

* * * * *